United States Patent [19]
Pelzer

[11] Patent Number: 5,090,288
[45] Date of Patent: Feb. 25, 1992

[54] ENCLOSURE FOR LIQUID JET CUTTER

[76] Inventor: Helmut Pelzer, Neue Strasse 5, D-5804 Herdecke-Ende, Fed. Rep. of Germany

[21] Appl. No.: 580,836

[22] Filed: Sep. 10, 1990

[30] Foreign Application Priority Data

Sep. 8, 1989 [DE] Fed. Rep. of Germany ....... 3929909

[51] Int. Cl.⁵ .............................................. B26F 3/00
[52] U.S. Cl. ........................................ 83/860; 83/177
[58] Field of Search .................. 83/53, 177, 859, 860; 51/410, 418, 421, 424, 426; 52/79.14

[56] References Cited

U.S. PATENT DOCUMENTS

| | | | |
|---|---|---|---|
| 2,073,184 | 3/1937 | Schweitzer | 51/448 |
| 3,877,334 | 4/1975 | Gerber | 83/53 X |
| 4,138,833 | 2/1979 | Townend | 52/79.14 X |
| 4,182,170 | 1/1980 | Grupp | 83/53 X |
| 4,326,362 | 4/1982 | Williams et al. | 51/424 |
| 4,557,171 | 12/1985 | Stolzer | 83/859 X |
| 4,686,877 | 8/1987 | Jaritz et al. | 83/53 X |
| 4,723,378 | 2/1988 | VanKuiken, Jr. et al. | 51/424 |

Primary Examiner—Frank T. Yost
Assistant Examiner—Rinaldi Rada
Attorney, Agent, or Firm—R. H. Siegemund

[57] ABSTRACT

An enclosure for housing and operating liquid jet cutters includes concrete, U-shaped upside down positioned modules interconnected where needed and possibly having one end (or both) closed by concrete front plates that permitted the passage of work pieces, while confining spray water as much as possible to the interior of the module. The concrete material resists the cutting effect of a jet that has gone astray.

7 Claims, 1 Drawing Sheet

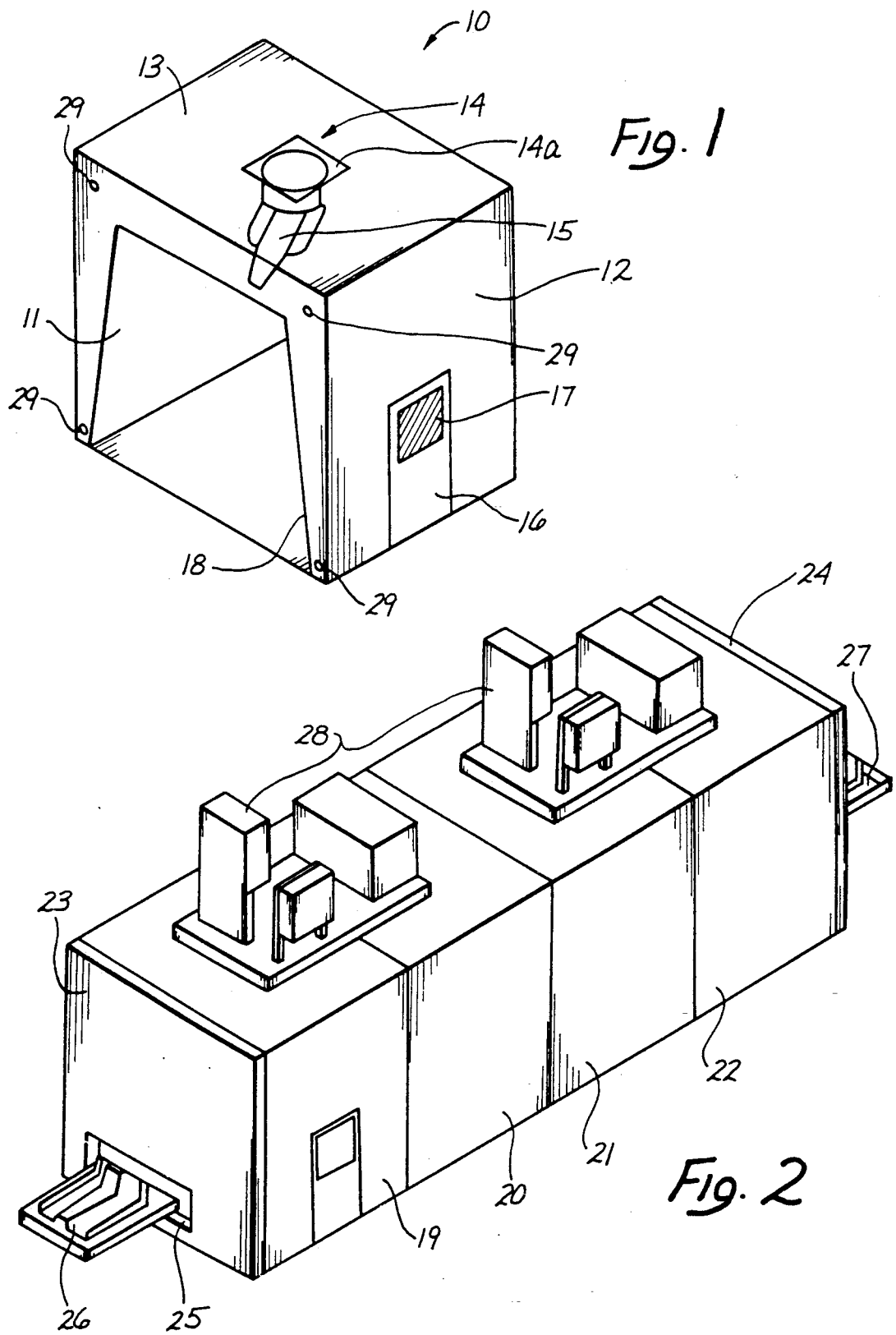

ENCLOSURE FOR LIQUID JET CUTTER

BACKGROUND OF THE INVENTION

The present invention relates to an enclosure or housing or the like for accommodating a liquid jet cutting tool which is actually fastened to the inside of the enclosure for operation while the enclosure or housing is provided with openings for the passage of work pieces, the openings being situated in two different at least essentially vertical wall portions of the enclosure or housing arranged for facing each other.

The German petty patent—utility model 8506331 suggests a liquid beam or jet cutting tool which directs a jet of high pressure on the work piece to be cut. Such a tool broadly finds utility in the motor vehicle industry e.g. for working of instrument panels, cooling grids, roof covers, floor covers or the like, from raw sheet stock. This liquid cutting technique replaces previously practiced methods using solid tool cutters as well as punching.

The aforementioned petty patent and utility model shows also a housing for the liquid jet tool which is closed on all sides except for openings to introduce as well as to extract pieces to be worked. The housing is constructed such that it has a roof portion from which the cutting tool is suspended, and the tool itself is directed through remote control.

The petty patent and utility model is of the kind that is directed to configuration aspects and it is therefore not surprising that it does not refer to any material from which this enclosure or casing is made. This lack of information as far as the particular field is concerned poses a variety of problems which as far as the utility patent is concerned seem to have been brushed aside but have to be considered when practical considerations are made concerning the making of such a housing or enclosure.

First of all there is a strength requirement; since the tool has to be mounted and positioned and held so that the forces as they occur during jet ejecting and cutting operation can be taken up with certainty. In other words the reaction of the tool against the jet and any return reaction that results from impingement of the jet upon the solid object produces forces which have to be taken up by the housing, at least that part of the housing on which the tool is mounted; but not only that, these forces must not set the tool and the housing into some kind of oscillation or vibratory motion. This is a severe problem which is almost automatically encountered owing to the fact that one of the mechanical force acting—reacting components is a liquid. Still, in order to provide for adequate cutting the cutting process must not result in the setting up of vibrations of the tool holding facility, that is the housing or enclosure or any part thereof.

Another seemingly trivial but in reality very significant problem is that the entire procedure of cutting process by means of a jet is a very noisy one. This noise cannot be tolerated and has to be attenuated. Another point is this; owing to the fact that water is seemingly a very economical media as a jet cutter, it is clear that all these various parts including a housing and so forth have to be corrosionproof whereby it should be realized that not only is water by itself a corroding substance, but the operation of liquid under very high pressure in the dynamic sense of the jet are all aspects contributing to corrosion and erosion of whatever is being hit.

A still further factor which is to be considered at this juncture is to be seen in fact that the process of a high speed water jet hitting something, anything, results in the inherent generation of a fog which again has certain corroding effects. Still another problem arises from the point that the wall of the enclosure or housing must in effect be very thick. By some accident it may be that a jet is redirected or better misdirected and rather than hitting the workpiece it hits the housing wall. Now obviously this should not provide a cutting action into the housing. The added proviso that such an accident must not only not destroy the housing is motivated by the following. If for some fluke or accident the jet does hit the housing and e.g. cuts a hole into the housing wall, people on the outside who happen to be in the vicinity could in fact be severely injured, and of course other objects that happen to be in the direction of emerging beam can be damaged too.

It can thus be seen that the making of such an enclosure and housing for a liquid jet cutting tool is not a trivial task. The seemingly obvious way of solving this problem is to construct a housing and enclosure of thick steel walls and in fact this approach has been offered. But that is not the answer. First of all, a regular steel housing is inherently quite elastic. A steel housing offers advantages; but on the other hand s steel housing is prone to undergo vibrations; such housing can even set them up vibrations for any reason. Hence the kind of vibrations and oscillations that may occur or for which there may be a tendency to set up such vibration, have to be suppressed. In fact it seems necessary to include stiffening ribs of a variety and complex matter in order to avoid that the steel housing is set into a vibratory motion.

Owing to the forces that arise these structures have to be very strongly dimensioned in order to be effective at all. Also of course the housing and enclosure including the stiffening structure has to be of some kind of closed configuration. This then leads to an inherently large amount of material that goes in the making of such a housing and enclosure. The corrosion problem outlined above could be counteracted e.g. through zinc plating. But now one encounters the problem that such a plating, though in effect a good corrosion proofing layer, is very sensitive against a kind of residual pressure of the jet. In particular, if that layer is (accidentally) hit directly by a jet it is immediately destroyed. Hence one has to include deflection sheets to avoid this possibility. These sheets may be made of steel, but if they are zinc plated, then the same problem arises; they will be subject to corrosion and little is gained. As far as the steel housing is concerned, it is of course by and in itself not a sound insulator. Therefore in order to provide the sound proofing alluded to above one will need a particular cover, lining, filling of cavities and so forth to be included in the construction of the housing and enclosure in order to provide the requisite sound attenuation. Now here again one faces the problem of corrosion. As far as this lining is concerned, there is always the problem, what happens if a misdirected jet cuts a hole into the housing at some totally unforseen location and ejects a jet towards the outside in a completely unforseeable direction and time. This is simply a problem that has not been taken care of by the various concepts concerning other problems. Obviously one answer would be to make the housing thicker and thicker and thus heavier and more expensive which is a rather primitive, unimaginative and undesirable solution.

DESCRIPTION OF THE INVENTION

It is an object of the present invention to provide a new and improved housing for a liquid jet cutting tool of the type outlined above which avoids the various problems mentioned above and owing to the desired material savings it is considerably less expensive than many of the versions discussed earlier.

In accordance with the preferred embodiment of the present invention it is suggested to provide a housing and enclosure for such a tool in that two parallelly positioned, vertical wall parts face each other and are adjoined by a roof or cover so that this particular integral configuration has an upside down U-shaped cross section; this enclosure is to be made from concrete in which holders are embedded, on the inside of the roof, and the cutting tool can be suspended from one of the holders; on the two front faces of this enclosure fastening means are provided either for releasably fastening of a front plate that is also made of concrete and is provided with an opening for the tool, or for connection to another similar reconstructed concrete body.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a single component housing or casing constructed in accordance with the preferred embodiment of practicing the invention for the best mode thereof;

FIG. 2 shows a composite housing made of a plurality of individual houses each made and shown in FIG. 1.

Proceeding to the detailed description of the drawings FIG. 1 illustrates a housing and enclosure generally referred to by reference numeral 10. This housing and enclosure 10 is comprised of two vertical wall parts 11 and 12 which face each other across the space that is the interior of the enclosure. They both get on or are anchored to the ground and are joined on top by means of the roof or cover portion 13. In fact parts 11,13,12 constitute a unitary concrete body of U-shaped cross section. In a planar fashion and from below a holder of 14 is cast into the ceiling or roof part 13. This holding device 14 is provided for the suspension of a liquid jet cutting tool 15.

The wall 12 for instance has an opening that is closed by a door 16 with a window 17. On the other side, i.e. the wall 11, there may be no opening at all or just a window or a door, possibly with window just in wall 12. The internal cross-sectional contour of the concrete body 10 is of trapezoidal configuration in that the wall thickness increases from bottom to the top, while the outside wall surfaces are vertical.

The front face of said housing 10, being visible in FIG. 1 is provided with fastening means 29 such as anchoring pins or bolts or the like for purposes of fastening thereto a frontal part such as identified by reference numeral 23 or 24 in FIG. 2, basically closing off the interior of the U-shaped housing 10 from one side or the other or both. In addition, the fastening elements 29 are provided for fastening the enclosure module to a similar enclosure module. In other words, the enclosure shown in FIG. 1 is a module that can serve as the end module of a larger assembly, on one end or the opposite end, or as an interior module.

The large scale housing shown in FIG. 2 is in fact comprised of four concrete bodies 19, 20, 21 and 22 each of them made as shown in FIG. 1 as identified by reference numeral 10. These four concrete elements 19-22 are interconnected through the fastening elements 29 interconnecting to form a whole. The front end of the element 19 and the rear end of 22 (what is front and what is rear is arbitrary in principle) are connected and secured to these front plates 23, 24 respectively. As specifically seen as for the front plate 23 is concerned but the following is applicable to both of them they have openings 25 through which work pieces such as 26 and 27 can pass. They pass from one end of the housing to the other end. Auxiliary operating devices 28 are provided in top of the roots 13 for operating the tools inside of the combined enclosures.

The particular advantage of the invention is to be seen in that any and all of the elements 10, or 19, 20 etc used therein are made of concrete. This feature permits that appropriate holders for the tool to be cast into the enclosure e.g. the ceiling. The holder may be realized through a basket made of iron mesh. Bolts are included in this mesh, unreleasably and are made a part of the mesh structure. These bolts have threaded portions on the lower ends. The basket itself becomes part of the concrete roof 13 and the threads of the belts stick out and are accessible from below. The threaded bolts or pins may for example traverse a particular plate that is likewise cast and embedded in the ceiling and roof part 13. A particular plate is shown as 14a and such a plate as cast into the roof is more or less flush with the downward facing ceiling of the roof part or cover 13.

As the mesh is cast into the concrete of the roof part 13 one establishes a holder for the tool 15 which is very strong and is not prone to vibration. Therefore this tool will be able to take up high acceleration forces for a water jet cut operation. In order to provide a broad field of application it may be of advantage to have in fact several of these holders such as a plurality of plates like 14a with traversing pins inserted on the inside of the roof 13 and cast therein so that one can put the cutting tool in different positions and locations of the interior of the enclosure.

The most important aspect of the inventive enclosure is to be seen in the utilization of particular properties of the concrete. This material, by its very nature is a sound attenuated material and will therefore attenuate the noise resulting from the cutting process. The concrete is of course completely corrosionproof as against water, particularly when smoothed out provided with a smooth surface. Concrete is resistant against the erosive effect of water. So called steel concrete can be used such as a concrete known under the designation "B25 concrete". A polymer concrete is also usable.

It is an important feature that the concrete structure of the inventive enclosure is highly resistant to avoid accidental and undesired traversal by the unattenuated liquid jet should that jet accidentally hit specific portions. The concrete is sufficiently resistant in order to avoid any kind of damage on the outside. By means of the fastening structures 29 both front ends of the housing and enclosure module 10 can be closed respectively by plates 23, 24. This way a minimally dimensioned housing and enclosure is provided. Each of these front plates have, of course, openings for the passage of workpieces. One will choose a configuration in FIG. 2 e.g. if multiple cutting operations are provided.

In order to monitor the interior of the enclosure and particularly the workings of the tools therein and also of course in order to provide the facility with opportunities for inspection one side is provided with door 16 and window 17. The door 16 is particularly advantageous for the case of maintenance. In other words the door provides access to the interior of the enclosure without having to take it partially apart.

For reasons of increased mechanical load in the case of vibrations or the like owing to the action of the liquid jet tool, it is suggested to have the internal contour of the U-shaped cross section provided with a trapezoidal configuration 18 as shown. This is another way of saying that the upper part of the wall is thicker than the lower part. It was simply found that this kind of configuration has a highly beneficial effect on taking up vibrational loads and attenuating the same. The dimensions of the walls 11 and 12 are thus that they are adapted to the forces of a force pattern that may arise. This making the lower parts of the wall thinner of course minimizes on the other hand the amount of material being used.

The housing and enclosure as shown can be basically placed on a plane floor in a work hall by itself. This is an old practice, but is intended to establish a practical limitation. It is possible to provide the lower ends of the walls 11 and 12 with facilities for anchoring the construction to the ground. For example the downwardly facing end portions of the U-legs of this enclosure configuration may have cast into it certain bolts or the like so that the device can be placed on the usual and conventional foundations for machines that they are generally present in work facilities of which the cutting tool arrangement becomes a part.

The invention is not limited to the embodiments described above but all changes and modifications thereof, not constituting departures from the spirit and scope of the invention, are intended to be included.

I claim:

1. Housing for a liquid jet tool cutter, the housing being accessible from the outside for passage of workpieces comprising:

two walls facing each other and being interconnected on top by a roof in integral enclosure configuration therewith and having an overall downward facing U-shaped cross section;

said integral configuration being made of concrete;

the concrete enclosure configuration having a front end face and a rear end face, both faces being provided with fastening means, either (a) for establishing a connection to a front or a rear plate covering the respective end face of that U-shaped configuration and being provided with openings for passage of workpieces, or (b) for connection to a similar concrete U-shaped enclosure configuration; and cast-in holding means in an inwardly downward facing face of the roof for connection and suspension of a liquid jet cutting tool.

2. Housing as in claim 1, one of the walls being provided with an opening for a window or a door or both.

3. Housing as in claim 1 wherein an internal contour of the U-shaped cross section is trapezoidal resulting in an increased thickness of the walls towards the ceiling.

4. Housing as in claim 1 there being operating devices provided on top of the roof.

5. A plurality of enclosures as set forth in claim 1, the plurality of the enclosures taken together have a front end and a rear end, the front end being closed by said front cover, the rear end is closed by another similar front end cover, each of the front end covers being provided with openings for the passage of workpieces.

6. Housing as in claim 1, lower ends of the U-shaped enclosure configuration being provided for fastening to a floor or foundation.

7. Housing as in claim 5, lower ends of the U-shaped enclosure configuration being provided for fastening to a floor or foundation.

* * * * *